(12) United States Patent
Raciniewski et al.

(10) Patent No.: US 10,870,389 B2
(45) Date of Patent: Dec. 22, 2020

(54) ILLUMINATED AUTOMOBILE COMPONENT

(71) Applicant: Lumitex, Inc., Strongsville, OH (US)

(72) Inventors: Alina Raciniewski, Parma, OH (US);
Alan Greszler, Strongsville, OH (US);
Timothy Orr, Canton, OH (US);
Benjamin Dalessandro, Middleburg Hieghts, OH (US)

(73) Assignee: Lumitex Inc., Strongsville, OH (US)

( * ) Notice: Subject to any disclaimer, the term of this patent is extended or adjusted under 35 U.S.C. 154(b) by 0 days.

(21) Appl. No.: 16/507,551

(22) Filed: Jul. 10, 2019

(65) Prior Publication Data

US 2020/0017021 A1 Jan. 16, 2020

Related U.S. Application Data

(60) Provisional application No. 62/695,944, filed on Jul. 10, 2018.

(51) Int. Cl.
| | | |
|---|---|---|
| *B60Q 1/26* | (2006.01) | |
| *B60Q 1/28* | (2006.01) | |
| *F21V 8/00* | (2006.01) | |
| *B60Q 1/00* | (2006.01) | |
| *F21S 41/64* | (2018.01) | |
| *F21S 41/24* | (2018.01) | |

(52) U.S. Cl.
CPC ............. *B60Q 1/28* (2013.01); *B60Q 1/0035* (2013.01); *B60Q 1/0094* (2013.01); *F21S 41/24* (2018.01); *F21S 41/64* (2018.01); *G02B 6/001* (2013.01)

(58) Field of Classification Search
CPC .................................. F21S 41/24; F21S 41/64
See application file for complete search history.

(56) References Cited

U.S. PATENT DOCUMENTS

| | | | | |
|---|---|---|---|---|
| 9,714,749 | B1* | 7/2017 | Salter | F21S 43/50 |
| 10,059,256 | B1* | 8/2018 | Diedrich | B60Q 1/2661 |
| 2015/0138807 | A1* | 5/2015 | Salter | F21S 41/16 |
| | | | | 362/510 |
| 2016/0090027 | A1* | 3/2016 | Tanaka | B60Q 1/2661 |
| | | | | 362/516 |
| 2017/0357040 | A1* | 12/2017 | Liu | G02B 6/001 |

* cited by examiner

*Primary Examiner* — Matthew J. Peerce
(74) *Attorney, Agent, or Firm* — Renner, Otto, Boisselle & Sklar, LLP

(57) ABSTRACT

An illumination assembly for illuminating an automotive component. The illumination assembly includes a light guide that emits light along its length and that has a shape of the automotive component.

30 Claims, 5 Drawing Sheets

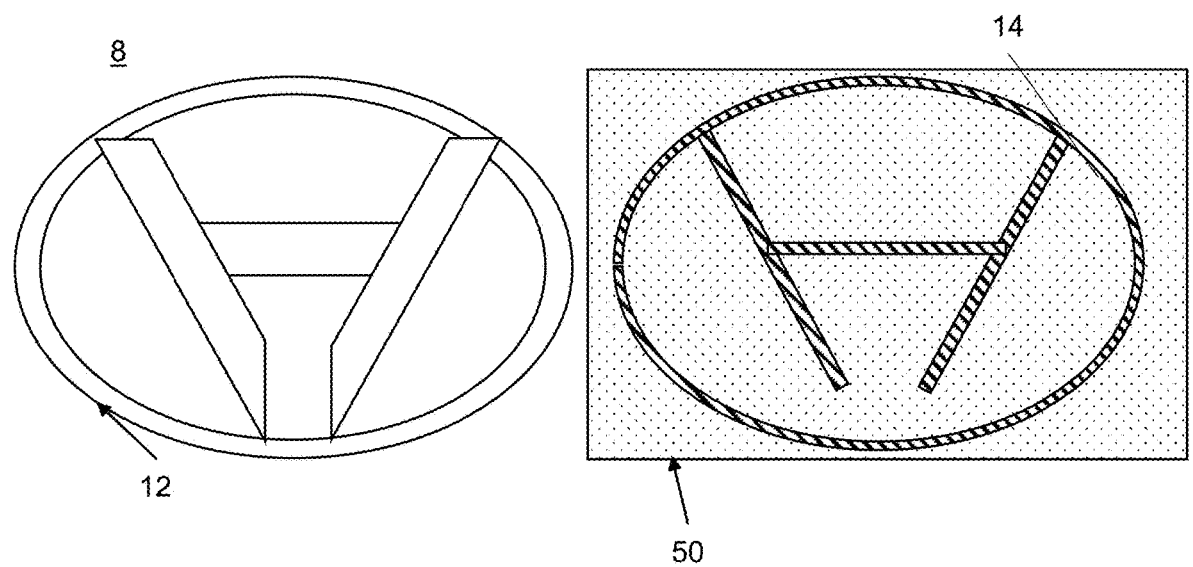
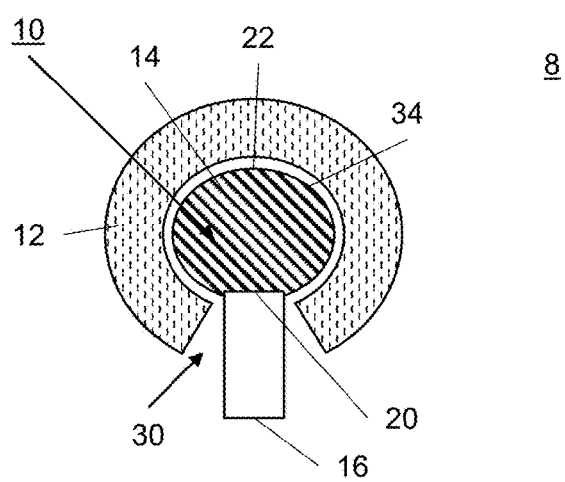

8

100

Forming a light guide into a shape corresponding to an automotive component 102

↓

Applying the light guide to a backside of the automotive component, such that light emitted from the light guide passes through translucent segments of the automotive component 104

ILLUMINATED AUTOMOBILE COMPONENT

RELATED APPLICATIONS

This application claims the benefit of U.S. Application No. 62/695,944 filed on Jul. 10, 2018, that is herein incorporated by reference in its entirety.

TECHNICAL FIELD

The present disclosure relates generally to automobiles and, in particular, to illumination of automobile components.

BACKGROUND

Illuminating automotive components (e.g., automotive grills) is known. For example, light sources have been placed behind automotive grills and emblems.

However, these past attempts at illuminating automotive components have typically been limited to light sources placed behind opaque objects (e.g., lighting behind a grill ornament).

SUMMARY

The present disclosure provides an illumination assembly for illuminating an automotive component. The illumination assembly includes a light guide that emits light along its length and that has a shape of the automotive component.

According to one aspect, the present disclosure provides an illumination assembly configured to illuminate an automotive component. The illumination assembly includes: at least one light source configured to emit light; and a light guide having a shape corresponding to the automotive component. The light guide has a light receiving end optically coupled to the at least one light source. The light guide is also configured to propagate light received from the light source along a length of the light guide. The light guide additionally includes light extracting structures configured to cause light to be emitted from the light guide.

Alternatively or additionally, the light extracting structures vary in concentration along the length of the light guide such that light appears to be uniformly emitted along the length of the light guide.

Alternatively or additionally, the light extracting structures are concentrated in particular areas such that: light is emitted from a top surface of the light guide; and greater light emission occurs from the top surface at the particular areas.

Alternatively or additionally, the top surface has a three-dimensional topography.

Alternatively or additionally, the light guide includes a top surface and one or more edges bordering the top surface. The light emitting structures include the one or more edges. Light is emitted via from the edges of the light guide.

Alternatively or additionally, the one or more edges are angled to affect an angle of the emitted light.

Alternatively or additionally, the one or more edges are angled such that the emitted light is directed towards a rear surface positioned behind the automotive component.

Alternatively or additionally, the light guide includes a bottom surface and the light receiving end is bounded by the bottom surface.

Alternatively or additionally, the light receiving end spans between the top and bottom surface of the light guide.

Alternatively or additionally, the illumination assembly includes a plurality of light sources. The light guide has a plurality of light receiving ends. Each of the plurality of light sources is optically coupled to one of the plurality of light receiving ends of the light guide.

Alternatively or additionally, the plurality of light sources include at least two types of light sources and the two types of light sources emit different colors of light.

Alternatively or additionally, automotive component comprises a grill having a lattice shape. The light guide comprises a continuous elongated structure. The light guide traverses the lattice shape of the grill such that: no portion of the light guide overlaps with another portion of the light guide; or a portion of the light guide overlaps with another portion of the light guide in an overlap area and the portion and the another portion are diffuse in the overlap area, such that the light emitted by the light guide is uniform between the overlap area and a nonoverlapping area of the light guide.

Alternatively or additionally, the light guide comprises at least one of multi-stranded optical fibers, a single fiber solid core optical fiber, woven optical fibers, or clad flat fiber.

Alternatively or additionally, the illumination assembly may additionally include a backing material. The light guide may be removably attached to the backing material and the backing material maintains the shape of the light guide.

Alternatively or additionally, the illumination assembly may additionally include circuitry configured to modulate emission of light by the light source.

Alternatively or additionally, the illumination assembly may additionally include a light modulator including a liquid crystal component. The light modulator may be positioned such that light emitted from the light guide interacts with the light modulator. The light modulator may be configured to affect a transmission of light emitted from the light guide. How the light modulator affects the transmission of the light emitted from the light guide may be controlled by the circuitry.

According to another aspect, the present disclosure provides an illuminated configuration including the illumination assembly and an automotive component illuminated by the illumination assembly.

Alternatively or additionally, the automotive component comprises at least one a grill, arm rest, door panel, or instrument cluster.

Alternatively or additionally, the illuminated configuration additionally includes circuitry configured to control the at least one light source to vary the illumination of the automotive component in time, such that at least one of the following changes with time: a portion of the automotive component being illuminated, a brightness of the illumination, or a color of the illumination.

Alternatively or additionally, the one or more light sources comprise a plurality of light sources. Each of the plurality of light sources illuminates a respective portion of the automotive component. The circuitry causes the illumination of the automotive component to vary with time by: changing in time which light sources of the plurality of light sources are emitting light.

Alternatively or additionally, the circuitry controls the at least one light source to cause an animation depending on a state received by the circuitry.

Alternatively or additionally, the state comprises startup, shut down, a gear change, a turn signal, or a hazards signal.

According to a further aspect, the present disclosure provides a method of manufacturing an illuminated grill for a vehicle. The method includes providing a grill for a vehicle. The grill has an array of grill segments that are at least partially translucent. The method also includes forming a light guide into a shape corresponding to the grill. The method further includes applying the light guide to a backside of the grill, such that light emitted from the light guide passes through the translucent grill segments.

Alternatively or additionally, the light guide is formed into the shape corresponding to the grill by positioning the light guide on the backside of the grill.

Alternatively or additionally, the method further includes encapsulating the light guide on the backside of the grill.

Alternatively or additionally, the light guide is formed into the shape corresponding to the grill by positioning the light guide on a backing material configured to maintain a position of the light guide.

Alternatively or additionally, the method further includes encapsulating the light guide prior to applying the light guide to the backside of the grill.

Alternatively or additionally, the backside of the grill includes a groove and the method further comprises positioning the encapsulated light guide within the groove.

Alternatively or additionally, the backside of the grill has a groove and the light guide is positioned within the groove of the grill.

Alternatively or additionally, the light guide has a light receiving end optically coupled to at least one light source. The light guide is configured to propagate light received from the light source along a length of the light guide. The light guide also includes light extracting structures configured to cause light to be emitted from the light guide.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 1 is a top view of an illumination configuration including an automotive component and an illumination assembly.

FIG. 2 is a cross sectional view of a segment of an illumination configuration showing the automotive component and the illumination assembly.

DETAILED DESCRIPTION

Figure 3:
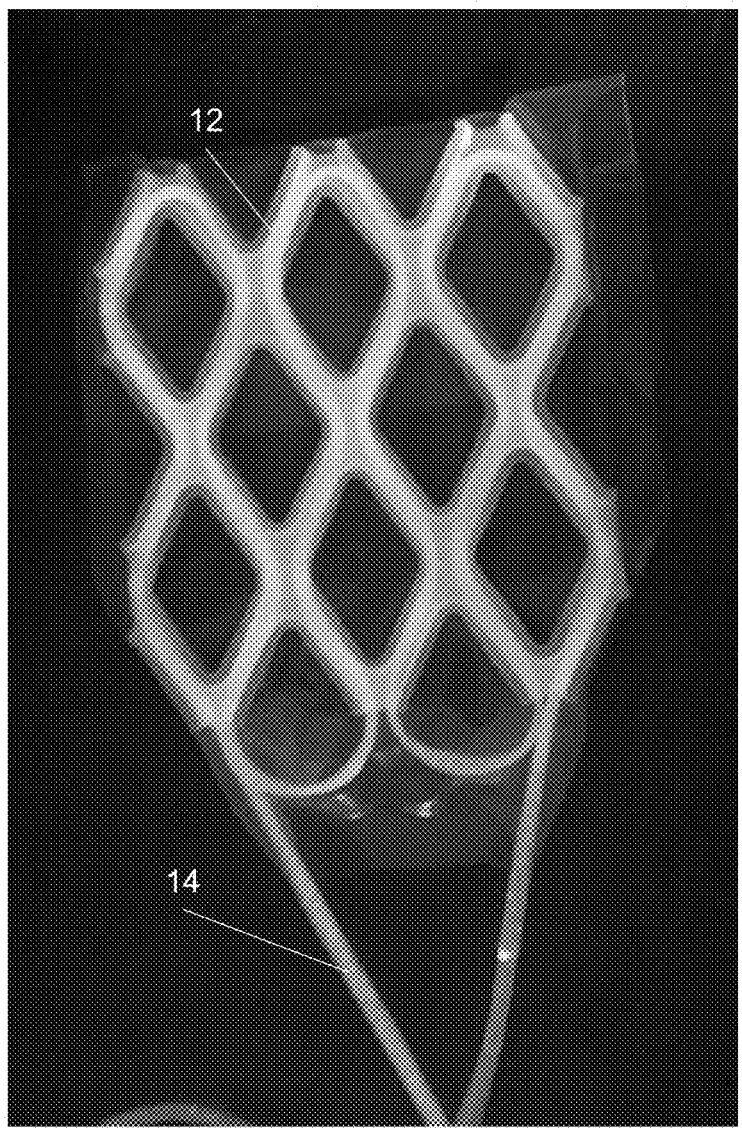
FIG. 3 is an exemplary illuminated vehicle grill according to the invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present invention provides an illumination assembly configured to illuminate an automotive component using a light guide, a light source, and light extracting structures.

Turning to FIGS. 1 and 2, an illuminated configuration 8 is shown including an illumination assembly 10 and an automotive component 12 that is illuminated by the illumination assembly 10. The illumination assembly 10 includes a light guide 14 having a shape corresponding to the automotive component 12 and at least one light source 16. The light guide 14 has a light receiving end 20 optically coupled to the light source 16 and propagates light received from the light source 16 along a length of the light guide 14. The light guide 14 also includes light extracting structures 22 configured to cause light to be emitted from the light guide 14.

The automotive component 12 may comprise parts used during construction of an automotive or aftermarket parts. For example, the automotive component 12 may comprise all or a portion of an automotive grill, hood ornament, emblem, door panel, instrument cluster, arm rest, etc. The automotive component 12 may include portions that are at least partially translucent to light emitted by the light source 16. As an example, the automotive component may comprise an automotive grill and the grill may include an array of grill segments that are at least partially translucent.

Figure 5:
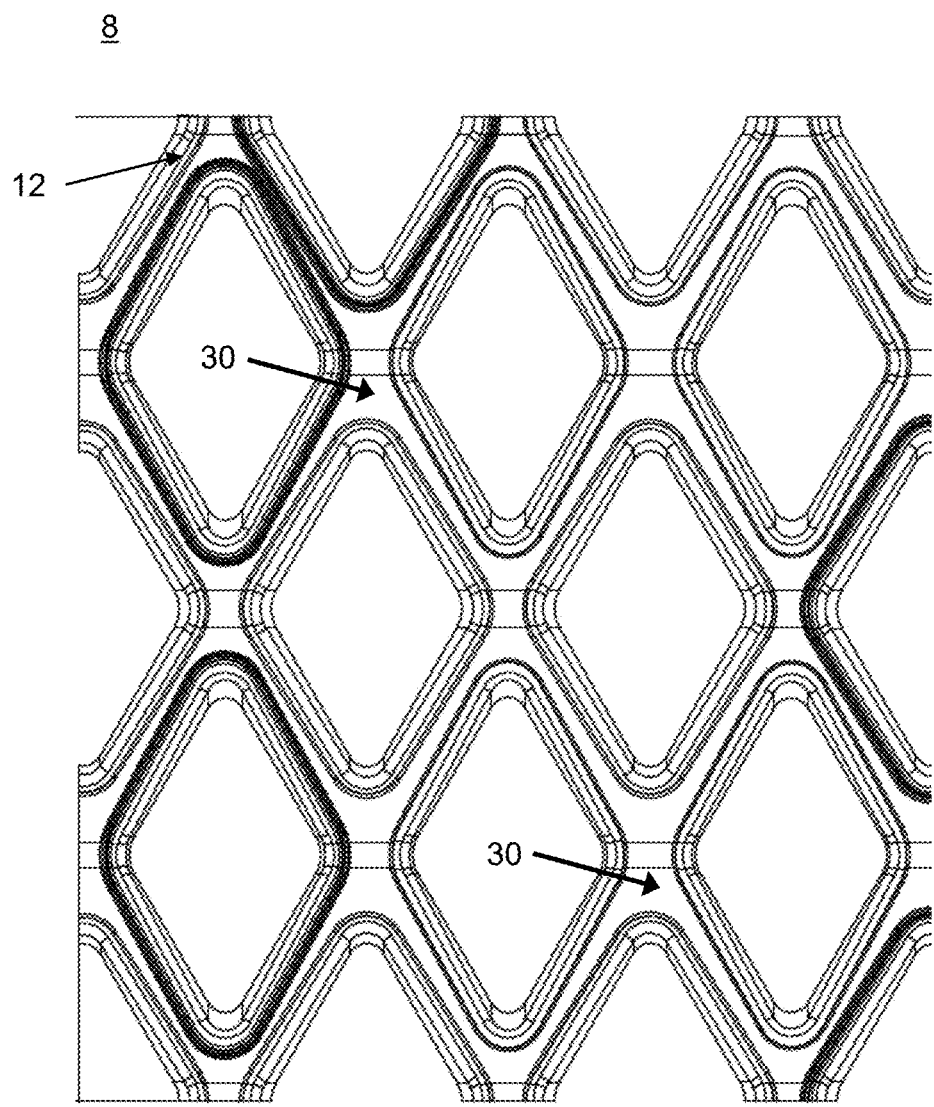
FIG. 5 is a front view of an automotive grill.

The illumination assembly 10 may be received on a back surface of the automotive component 12. As shown in FIGS. 2 and 5, the automotive component 12 may also include a groove 30 for receiving the illumination assembly 10. The light guide 14 may be positioned on the back of the automotive component 12 (e.g., within the groove 30) and the light guide 14 may be encapsulated (e.g., with epoxies, urethanes, silicones, etc.) to protect the light guide 14.

The automotive component 12 may appear as a reflective material in day light, while still emitting light from the light guide 14 at night. For example, the automotive component 12 may be covered with a transflective material that reflects external light, while still allowing light emitted from the light guide 14 to pass through the automotive component 12. For example, a reflective surface (which is translucent to the light emitted by the light guide 14) may be applied to a transparent automotive component 12 using vapor deposition.

Figure 4:
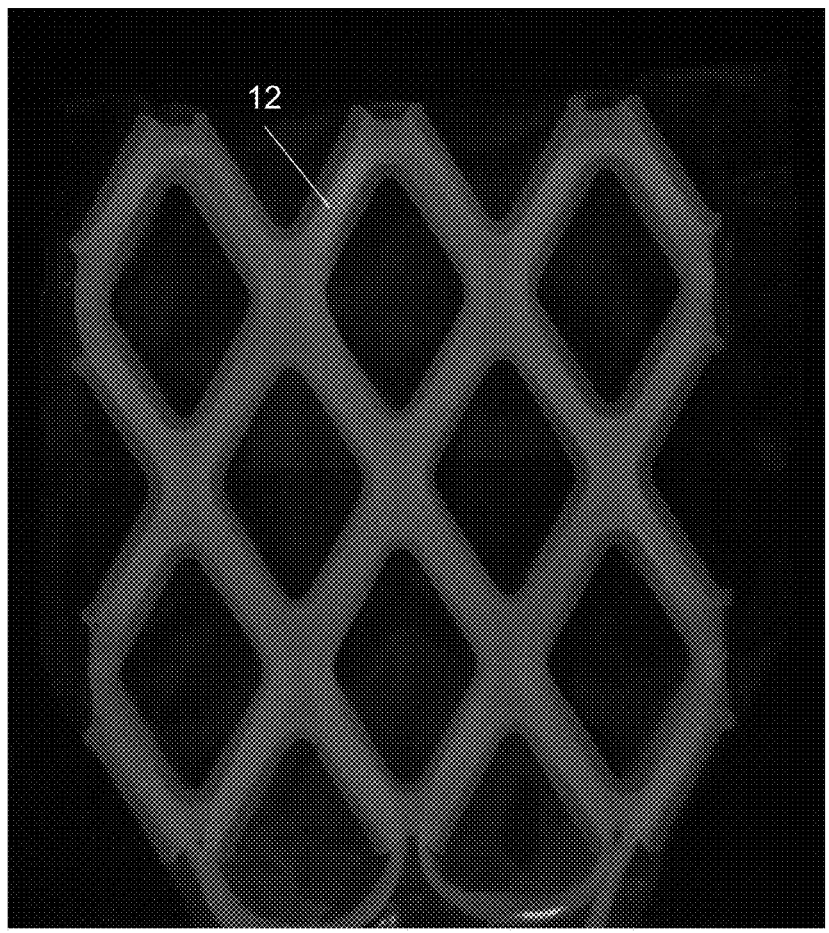
FIG. 4 is a zoomed in view of the illuminated vehicle grill of FIG. 3.

In an embodiment shown in FIGS. 3 and 4, the automotive component 12 may comprise an automotive grill having a lattice shape. The light guide 14 may have a continuous elongated structure (e.g., a tubular shape). The light guide 14 may traverse (e.g., in a serpentine pattern) the lattice shape of the grill, such that no portion of the light guide 14 overlaps with another portion of the light guide. Alternatively, the light guide 14 may overlap with proper optical diffusion. That is, a portion of the light guide may overlap with another portion of the light guide in an overlap area and the portion and the another portion may be diffuse in the overlap area, such that the light emitted by the light guide is uniform between the overlap area and a nonoverlapping area of the light guide. The overlap area being uniform with the nonoverlapping area may comprise the intensity of light emitted by the two areas not differing by more than 5%, 10% or 20%.

As described above, the light guide 14 has a light receiving end 20 optically coupled to the light source(s) 16. The light guide 14 is configured to propagate light received from the light source 16 along a length of the light guide 14 (e.g., via total internal reflection). The light guide 14 may be terminated to a single or multiple light sources 16.

As described above, light extracting structures 22 included in the light guide 14 cause light to be emitted from the light guide 14. The light extracting structures 22 may comprise disruptions at one or more areas along the length of the light guide 14. The disruptions may be formed by roughening, marring, abrading, etching, grit blasting or thermally deforming one areas or sides of the light guide. Alternatively or additionally, the light extracting structures 22 may comprise particles or voids located within the interior of the light guide 14. For example, the particles/voids may have a different index of refraction than the interior of the light guide, causing light to be extracted from the light guide.

The light extracting structures 22 may be configured to extract light in a defined intensity profile over the length of the light guide 14, such as a uniform intensity profile. For example, the concentration of the light extracting structures 22 may increase with distance from the light source 16, such that the light emitted from the light guide 14 appears to be uniform across the length of the light guide 14. Alternatively or additionally, the concentration of light extracting structures 22 may be concentrated in particular location(s), such that certain areas of the light guide 14 appear to be brighter than other areas. For example, light may be emitted from a top surface 34 of the light guide 14 as shown in FIGS. 3 and 4. As will be understood by one of ordinary skill in the art, the top surface 34 may have a three-dimensional topography.

Alternatively or additionally, the light guide 14 may include a top surface 34 and one or more edges 36 bordering the top surface. The light emitting structures 22 may include the one or more edges 36, such that light is emitted from the edges 36 of the light guide 14. For example, turning to FIG. 6, the illumination assembly 10 may include a light guide 14 positioned beneath an automotive component 12. The edges of the light guide 14 may be shaped such that light (shown using dashed lines in FIG. 6) is emitted at an angle from the light guide 14.

As will be understood by one of ordinary skill in the art, the one or more edges 36 may be angled to affect an angle of the emitted light. For example, the light emitted from the edges 36 of the light guide 14 may be spread out over a larger area by altering an angle of the edges 36. As an example, the edges 36 may be angled such that the emitted light is directed towards a rear surface 40 positioned behind the automotive component 12.

The light guide 14 may comprise any suitable structure for guiding light from a light source via total internal reflection. For example, the light guide 14 may comprise at least one of multi-stranded optical fibers, a single fiber solid core optical fiber, woven optical fibers, or clad flat fiber. The light guide 14 may be formed of any suitable material. For example, the light guide may be made from at least one of glass (e.g., for high temperature applications) or plastic.

The light guide 14 may comprise multiple light guides 14 having separate light paths. Each of the multiple light guides 14 may receive light from a different light source 16. Alternatively or additionally, multiple light guides 14 may receive light from the same light source 16. By using light sources 16 that emit different colors of light, it is possible to change the color of light emitted by the light guide 14.

The light guide may have a plurality of light receiving ends 20. Each of a plurality of light sources 16 may be optically coupled to one of the plurality of light receiving ends 20 of the light guide 14. For example, at least one of the plurality of light sources 16 may be optically coupled to at least two light receiving ends 20 of the light guide 14. As an example, the light guide 14 may comprise a fiber optic and a light source 16 may be optically coupled to both ends of the fiber optic. The light sources 16 may include at least two types of light sources and the two types of light sources emit different colors of light.

Figures 6, 7:
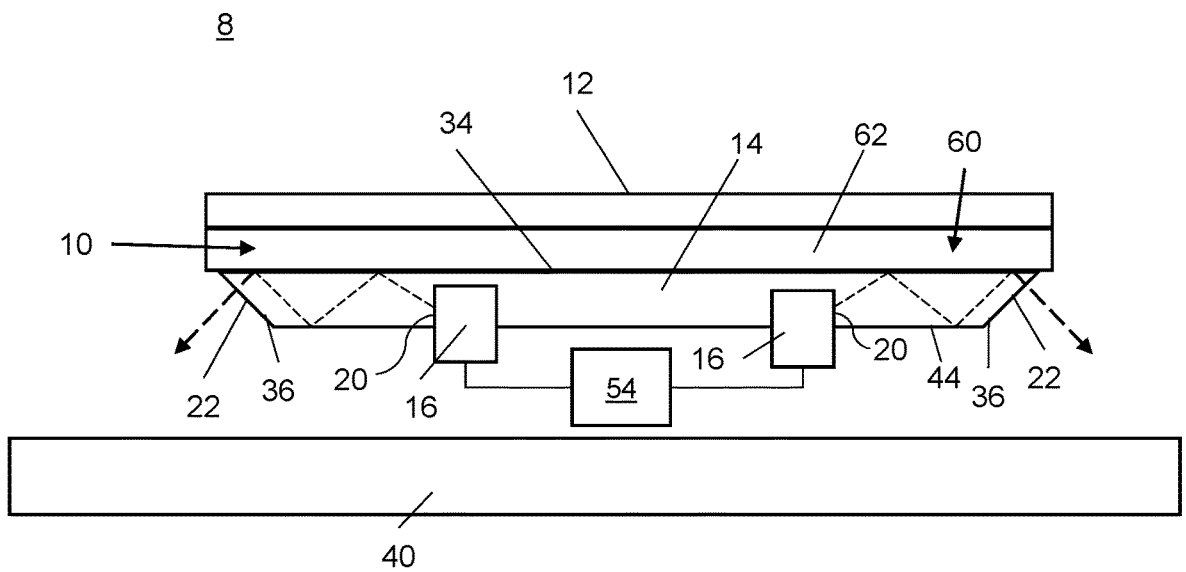
FIG. 6 is a side view of an illumination configuration including circuitry and a rear surface.
FIG. 7 is a flow diagram depicting a method of manufacturing an illuminated grill for a vehicle.

With continued reference to FIG. 6, the light guide 14 may include a bottom surface 44 and the light receiving end 20 may be bounded by the bottom surface 44 as shown. For example, the light receiving end 20 may span between the top 34 and bottom surface 44 of the light guide 14 as shown in FIG. 6. That is, the light guide 14 may include recesses for receiving an emission surface of the light source(s) 16 such that light emitted by the light source(s) 16 is received by the light guide 14.

The light source(s) 16 may emit any color of light. For example, when more than one light source 16 is used to illuminate the light guide 14, light sources 16 emitting different colors of light may be used. The light source(s) 16 may be isolated away from the automotive component 12 to protect the light source(s) 16 from issues caused by heat, vibration, and electricity.

The light source(s) 16 may comprise one or more light emitting diodes (LEDs), fluorescent sources, incandescent sources, lasers, or any suitable source of light.

Turning back to FIG. 1, the illumination assembly 10 may also include a backing material 50. The light guide 14 may be removably attached to the backing material 50. The backing material 50 may be used to maintain the shape of the light guide. For example, the backing material 50 may be used to maintain the shape of the light guide into a shape corresponding to the automotive component 12. The backing material 50 may be a sheet of material (e.g., cardboard, paper, plastic, etc.) having an adhesive surface.

The illumination assembly 10 may additionally include a circuitry 54 configured to modulate emission of light by the light source(s) 16. For example, the color, intensity, etc. of the light emitted by the illumination assembly 10 may signal when the automobile is braking, accelerating, and/or taking some other action (e.g., turning). As another example, autonomous vehicles could use the illumination assembly to signal to pedestrians and/or other vehicles when it is safe to cross in front of the vehicle. For example, the illumination assembly 10 could emit green light when the vehicle is moving or about to move and could emit red light when the vehicle is stopped.

The circuitry 54 may be further configured to control the light source(s) 16 to vary the illumination of the automotive component 12 in time, such that at least one of the following changes with time: a portion of the automotive component 12 being illuminated, a brightness of the illumination, or a color of the illumination.

For example, the illumination assembly 10 may include a plurality of light sources 16 and each of the plurality of light sources 16 may illuminate a respective portion of the automotive component 12. The circuitry 54 may cause the illumination of the automotive component 12 to vary with time by changing in time which light sources 16 of the plurality of light sources are emitting light.

As an example, the circuitry 54 may control the light source(s) to cause an animation depending on a state received by the circuitry 54. The state may comprise startup, shut down, a gear change, a turn signal, a hazards signal, etc.

As will be understood by one of ordinary skill in the art, the circuitry 54 may have various implementations. For example, the circuitry 54 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 54 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 54. The circuitry 54 may be communicatively coupled to the computer readable medium and network interface through a system bus, mother board, or using any other suitable structure known in the art.

With continued reference to FIG. 6, the illumination assembly 10 may additionally include a light modulator 60 including a liquid crystal component 62. The light modulator 60 may be positioned such that light emitted from the light guide 14 interacts with the light modulator 60. The light modulator 60 may be configured to affect a transmission of light emitted from the light guide 14. The circuitry 54 may control how the light modulator affects the transmission of the light emitted from the light guide 14.

For example, the illumination assembly 10 may illuminate a door sill and the light modulator 60 may comprise a liquid crystal component 62 (e.g., the liquid crystal portion of a liquid crystal display). The circuitry 54 may control the liquid crystal portion 62 to specify which portions of the door panel are illuminated. As an example, the illumination assembly 10 may illuminate the door panel in an animation sequence depending upon a state of the vehicle. For example, when the car is turned on, the door panel may illuminate in one particular animation sequence associated with the car vehicle turning on. The door panel may also be illuminated in a different sequence when the vehicle plays music (e.g., the animation may pulse or move in a pattern matching a property of the music).

As described above, the illuminated configuration 8 may comprise an illuminated grill (i.e., the automotive component 12 may comprise a grill). The illuminated grill may be assembled in various ways. For example, grooves 30 may be made in the grill 12 and the light guide 14 may be laid into the grooves 30. As an example, the light guide 14 may be formed into a shape corresponding to the grill 12 (e.g., attached to the backing material 50). The shaped light guide 14 may then be applied to a backside of the grill 12, such that light emitted from the light guide 14 passes through the translucent grill segments. If the light guide 14 is attached to a backing material 50, the backing material 50 may be removed from the light guide 14 when the light guide 14 is positioned on the grill 12.

As another example, in FIGS. 3 and 4, fiber optics were laid in a serpentine pattern. The light guide 14 may be laid directly into the groove 30 of the grill 12 without the use of a backing material 50. In still another example, the light guide 14 may be molded into the shape of the grill 12 and the light guide 14 may then be clad.

Turning to FIG. 7, a method 100 of manufacturing the illuminated grill for a vehicle is shown. In process block 102, a grill for a vehicle is provided and a light guide is formed into a shape corresponding to the grill. In process block 104, the light guide is applied to a backside of the grill, such that light emitted from the light guide passes through the translucent segments of the grill.

The method may also include encapsulating the light guide on the backside of the grill. Alternatively or additionally, the light guide may be encapsulated prior to applying the light guide to the backside of the grill.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An illumination assembly configured to illuminate an automotive component, the illumination assembly comprising:
    at least one light source configured to emit light; and
    a light guide having a shape corresponding to the automotive component, wherein the light guide:
        has a light receiving surface optically coupled to the at least one light source;
        is configured to propagate light received from the light source along a length of the light guide;
        includes light extracting structures configured to cause light to be emitted from the light guide; and
        includes at least one cavity formed in a bottom surface of the light guide and bounded by the light receiving surface;
    wherein the at least one light source is inserted at least partially through the bottom surface into one of the at least one cavity
    wherein the light guide includes a top surface and one or more edges bordering the top surface;
    wherein the light emitting structures include the one or more edges;
    wherein light is emitted via from the edges of the light guide;
    wherein the one or more edges are angled to affect an angle of the emitted light; and
    wherein the one or more edges are angled such that the emitted light is directed towards a rear surface positioned behind the automotive component.

2. The illumination assembly of claim 1, wherein the light extracting structures vary in concentration along the length of the light guide such that light appears to be uniformly emitted along the length of the light guide.

3. The illumination assembly of claim 1, wherein the light extracting structures are concentrated in particular areas such that:
    light is emitted from a top surface of the light guide; and greater light emission occurs from the top surface at the particular areas.

4. The illumination assembly of claim 3, wherein the top surface has a three-dimensional topography and light is emitted from a top surface of the light guide.

5. The illumination assembly of claim 1, wherein the at least one light source is a side emitting light source that emits light along a length of the light guide.

6. The illumination assembly of claim 1, wherein:
the illumination assembly includes a plurality of light sources;
the light guide has a plurality of light receiving surfaces; and
each of the plurality of light sources is optically coupled to one of the plurality of light receiving surfaces of the light guide.

7. The illumination assembly of claim 6, wherein the plurality of light sources include at least two types of light sources and the two types of light sources emit different colors of light.

8. The illumination assembly of claim 1, wherein the light guide comprises at least one of multi-stranded optical fibers, a single fiber solid core optical fiber, woven optical fibers, or clad flat fiber.

9. The illumination assembly of claim 1, further comprising a backing material, wherein the light guide is removably attached to the backing material and the backing material maintains the shape of the light guide.

10. The illumination assembly of claim 1, further comprising circuitry configured to modulate emission of light by the light source.

11. An illuminated configuration comprising:
the illumination assembly of claim 1;
an automotive component illuminated by the illumination assembly.

12. The illuminated configuration of claim 11, wherein the automotive component comprises at least one a grill, arm rest, door panel, or instrument cluster.

13. The illuminated configuration of claim 11, further comprising circuitry configured to control the at least one light source to vary the illumination of the automotive component in time, such that at least one of the following changes with time:
a portion of the automotive component being illuminated, a brightness of the illumination, or a color of the illumination.

14. The illuminated configuration of claim 13, wherein:
the one or more light sources comprise a plurality of light sources;
each of the plurality of light sources illuminates a respective portion of the automotive component;
the circuitry causes the illumination of the automotive component to vary with time by: changing in time which light sources of the plurality of light sources are emitting light.

15. The illuminated configuration of claim 13, wherein the circuitry controls the at least one light source to cause an animation depending on a state received by the circuitry.

16. The illuminated configuration of claim 13, wherein the state comprises startup, shut down, a gear change, a turn signal, or a hazards signal.

17. An illumination assembly configured to illuminate an automotive component comprising a grill having a lattice shape, the illumination assembly comprising:
at least one light source configured to emit light; and
a light guide having a continuous elongated structure shape corresponding to the automotive component such that the light guide traverses the lattice shape of the grill, wherein the light guide:
has a light receiving surface optically coupled to the at least one light source;
is configured to propagate light received from the light source along a length of the light guide;
includes light extracting structures configured to cause light to be emitted from the light guide; and
includes at least one cavity formed in a bottom surface of the light guide and bounded by the light receiving surface;
wherein the at least one light source is inserted at least partially through the bottom surface into one of the at least one cavity.

18. The illumination assembly of claim 17, wherein the light extracting structures vary in concentration along the length of the light guide such that light appears to be uniformly emitted along the length of the light guide.

19. The illumination assembly of claim 17, wherein the light extracting structures are concentrated in particular areas such that:
light is emitted from a top surface of the light guide; and
greater light emission occurs from the top surface at the particular areas.

20. The illumination assembly of claim 19, wherein the top surface has a three-dimensional topography and light is emitted from a top surface of the light guide.

21. The illumination assembly of claim 17, wherein the at least one light source is a side emitting light source that emits light along a length of the light guide.

22. The illumination assembly of claim 17, wherein:
the illumination assembly includes a plurality of light sources;
the light guide has a plurality of light receiving surfaces; and
each of the plurality of light sources is optically coupled to one of the plurality of light receiving surfaces of the light guide.

23. The illumination assembly of claim 22, wherein the plurality of light sources include at least two types of light sources and the two types of light sources emit different colors of light.

24. The illumination assembly of claim 17, wherein the light guide comprises at least one of multi-stranded optical fibers, a single fiber solid core optical fiber, woven optical fibers, or clad flat fiber.

25. The illumination assembly of claim 17, further comprising a backing material, wherein the light guide is removably attached to the backing material and the backing material maintains the shape of the light guide.

26. The illumination assembly of claim 17, further comprising circuitry configured to modulate emission of light by the light source.

27. An illuminated configuration comprising:
the illumination assembly of claim 17;
an automotive component illuminated by the illumination assembly.

28. The illuminated configuration of claim 27, wherein the automotive component comprises at least one a grill, arm rest, door panel, or instrument cluster.

29. The illuminated configuration of claim 27, further comprising circuitry configured to control the at least one light source to vary the illumination of the automotive component in time, such that at least one of the following changes with time:

a portion of the automotive component being illuminated, a brightness of the illumination, or a color of the illumination.

30. The illuminated configuration of claim 29, wherein:

the one or more light sources comprise a plurality of light sources;

each of the plurality of light sources illuminates a respective portion of the automotive component;

the circuitry causes the illumination of the automotive component to vary with time by: changing in time which light sources of the plurality of light sources are emitting light.

\* \* \* \* \*